US010375980B2

(12) United States Patent
Baechtle et al.

(10) Patent No.: US 10,375,980 B2
(45) Date of Patent: Aug. 13, 2019

(54) DEVICE AND METHOD FOR FORMING FOOD PRODUCTS

(71) Applicant: Albert Handtmann Maschinenfabrik GmbH & Co. KG, Biberach (DE)

(72) Inventors: Manfred Baechtle, Schemmerhofen (DE); Claudiu Cret, Bad Saulgau (DE); Daniel Teufel, Schemmerhofen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 211 days.

(21) Appl. No.: 15/099,497

(22) Filed: Apr. 14, 2016

(65) Prior Publication Data
US 2016/0302467 A1 Oct. 20, 2016

(30) Foreign Application Priority Data

Apr. 16, 2015 (EP) ..................................... 15163850

(51) Int. Cl.
*A23P 30/20* (2016.01)
*A23L 19/12* (2016.01)
(Continued)

(52) U.S. Cl.
CPC ............. *A23L 19/12* (2016.08); *A21C 9/085* (2013.01); *A21C 11/103* (2013.01);
(Continued)

(58) Field of Classification Search
CPC ........ A21C 11/103; A23L 13/65; A23L 19/12; A23P 30/20; B29C 47/0061;
(Continued)

(56) References Cited

U.S. PATENT DOCUMENTS 3,215,094 A * 11/1965 Oldershaw ............. A21C 11/16
100/907
3,647,330 A * 3/1972 Hann ................... B29C 47/0071
425/465
(Continued)

FOREIGN PATENT DOCUMENTS

AU 2014202070 A1 10/2014
CN 1640269 A 7/2005
(Continued)

OTHER PUBLICATIONS

Machine Translation of Office Action Issued in Japan Patent Application No. 2016047137, dated Mar. 7, 2017, 5 pages.
(Continued)

*Primary Examiner* — Joseph S Del Sole
*Assistant Examiner* — Joseph S Leyson
(74) *Attorney, Agent, or Firm* — McCoy Russell LLP

(57) ABSTRACT

The invention relates to a forming device for forming and partitioning a pasty food strand as well as to a filling machine with a respective forming device and to a method. The forming device comprises more than two flat displacement elements superposed in the direction of transport of the food strand, each having at least one opening through which the food strand can be moved in the direction of transport. The forming device further comprises a movement mechanism for moving the flat displacement elements on respective curved paths, such that the respective openings can move relative to each other, so that the cross-sectional area of the resulting overall opening of the superposed openings changes.

11 Claims, 13 Drawing Sheets

(51) Int. Cl.
    *B29C 48/30* (2019.01)
    *B29C 48/00* (2019.01)
    *A22C 11/10* (2006.01)
    *A21C 9/08* (2006.01)
    *A21C 11/10* (2006.01)
    *A23L 13/60* (2016.01)

(52) U.S. Cl.
    CPC ............ *A22C 11/104* (2013.01); *A23L 13/65* (2016.08); *A23P 30/20* (2016.08); *B29C 48/002* (2019.02); *B29C 48/0022* (2019.02); *B29C 48/301* (2019.02); *B29C 48/302* (2019.02); *A23V 2002/00* (2013.01)

(58) Field of Classification Search
    CPC . B29C 47/0066; B29C 47/122; B29C 47/124; B29C 48/002; B29C 48/0022; B29C 48/301; B29C 48/302
    See application file for complete search history.

(56) References Cited

U.S. PATENT DOCUMENTS

| | | | |
|---|---|---|---|
| 3,797,069 A | 3/1974 | Von Lersner et al. | |
| 4,479,768 A * | 10/1984 | Kube | D01D 4/02 264/142 |
| 6,892,630 B1 | 5/2005 | Huang | |
| 7,666,072 B2 | 2/2010 | Schalk | |
| 2003/0206990 A1* | 11/2003 | Edmondson | B29C 47/0016 425/466 |

FOREIGN PATENT DOCUMENTS

| | | | | |
|---|---|---|---|---|
| CN | 103385270 A | 11/2013 | | |
| CN | 203884549 U | 10/2014 | | |
| DE | 202005007176 U1 | 8/2005 | | |
| EP | 0194863 A2 | 9/1986 | | |
| EP | 0601194 A1 * | 6/1994 | ............ | A21C 11/00 |
| EP | 1576883 B1 | 10/2007 | | |
| EP | 2789239 A1 | 10/2014 | | |
| WO | 9324025 A1 | 12/1993 | | |
| WO | 2013139853 A1 | 9/2013 | | |

OTHER PUBLICATIONS

State Intellectual Property Office of the People's Republic of China, Office Action and Search Report Issued in Application No. 201610235802.X, dated Nov. 28, 2017, 12 pages. (Submitted with Partial Translation).

* cited by examiner

FIG. 11

1102
Actuate a movement mechanism such that more than two flat displacement elements are moved from a severing position to an open position on a curved path, where said flat displacement elements are in said severing position superposed such that no resulting overall opening of said superposed openings exists and a food strand is severed, and where a cross-sectional area of said overall opening in an open position is a predetermined maximum cross-section

1104
Move flat displacement elements then again on a curved path from said open position to said severing position, wherein said openings are for severing said food strand superposed such that edges defining said respective openings slide past one another such that said food product is cut off, or that said displacement elements are moved on the curved path only until the area of said overall opening becomes zero

1106
Move pasty food mass through an extrusion opening of a filling member and through an expanding or tapering overall opening of said flat displacement elements, wherein said pasty food mass is extruded continuously or in portions from said extrusion opening, and when said displacement elements are in said severing position, a speed of said food strand relative to said flat displacement elements is in a direction of transport reduced, including reduced to 0.

DEVICE AND METHOD FOR FORMING FOOD PRODUCTS

CROSS REFERENCE TO RELATED APPLICATIONS TECHNICAL FIELD

The present application claims priority to European Patent Application No. 15 163 850.9, entitled "DEVICE AND METHOD FOR FORMING FOOD PRODUCTS," filed on Apr. 16, 2015, the entire contents of which are hereby incorporated by reference for all purposes.

TECHNICAL FIELD

The invention relates to a forming device for forming and partitioning a pasty food strand, a filling machine for producing formed food, and a method for producing formed food products.

BACKGROUND AND SUMMARY

Various methods for forming pasty products are already known in the food industry. A method is described, for example, in EP 1 576 883 B1 in which two forming plates are moved linearly toward each other to change the cross-section of the passage opening.

However, this method poses problems in the production of rounded food products, such as balls or cylindrically formed items with rounded ends or drop-shaped products. This is for the reason that slit-like, cat-eye-shaped cross sections are created at the extruded strand by the motion of the two knives relative to each other. The ends of the portion are therefore not rounded as is evident in particular from FIG. 9.

To produce round ends, for example, so-called diaphragms are also used having multiple separating elements that can move up and down in the form of an iris diaphragm. A respective device is composed of many individual components. Handling, i.e. assembly, disassembly and cleaning are therefore cumbersome. The diaphragm can further not be closed such that the individual components are superposed, which means that this device is not suitable to sever a food strand, i.e. cut it off. A respective device is often operated in a single lane. Should production be done in multiple lanes, then the parallel set-up of multiple individual diaphragms is necessary. The number of components required greatly increases accordingly. Such configurations are then very complex for the operator to assemble and to disassemble and are also very costly. A corresponding device is known, for example, from WO 2013/139853 A1.

Starting out from the aforementioned prior art, the present invention is based on the object to provide a device and a method that enable simple forming and partitioning of a pasty food strand, where improved shaping is simultaneously achieved.

The forming device for forming and partitioning a pasty food strand according to the present invention comprises more than two flat displacement elements superposed in the direction of transport of the food strand. The flat displacement elements are disposed closely one on top of the other, so that they can slide past each other and thereby also sever the strand of filling material, i.e. cut it off. The flat displacement elements are preferably formed as flat displacement plates. The flat displacement elements each comprise at least one opening through which the food strand can be transported in the direction of transport. In addition, the invention comprises a movement mechanism for moving the flat displacement elements on a respective curved path, such that the respective openings are movable relative to each other. The respective openings are movable relative to each other so that the cross-sectional area of the resulting overall opening of the superposed openings changes.

Due to the fact that more than two flat displacement elements with respective openings are used which are moved on a curved path, a cat-eye shaped overall opening is not created in contrast to prior art, but instead a preferably rounded polygon whose size can vary on its curved path in dependence of the motion of the flat displacement elements. This means, for example, that (with initially completely superposed openings) a rounded polygon is upon movement of the displacement elements on a curved path created from an initially round overall opening and can produce a nicer rounded shape than in prior art.

Due to the fact that the flat displacement elements are moved with the movement mechanism and can with their openings slide past each other, the flat displacement elements can not only form the food strand, but also cut it off completely. A separate cutting tool can therefore be dispensed with. The device according to the invention can be easily manufactured and is easy to handle and to clean. The forming device can be easily placed at the extrusion end of a filling machine such that the center of the overall opening and the center of the extrusion opening for the pasty food strand are in alignment. The forming device according to the invention can therefore also be easily retrofitted. The forming device according to the invention can furthermore be integrated into existing systems in an extremely space-saving manner. Different product shapes can be produced with one and the same device by actuating the movement mechanism and respective extrusion speeds differently, without this requiring any mechanical changeover. Already three flat displacement elements provide significant advantages. Preferably 3 to 6, more preferably 3 to 4 displacement elements are used.

The movement mechanism is configured such that the flat displacement elements are movable to a severing position A in which the openings are aligned relative to each other such that the cross-sectional area of the overall opening is zero, meaning that the free overall opening is no longer present and the food strand is severed. The flat displacement elements are movable from this position to an open position O in which the cross-sectional area of the overall opening has a predetermined maximum cross-section. This cross-section then corresponds to the maximum cross-section of the product. The predetermined maximum cross-section there preferably corresponds to the cross-section of the openings when they are totally superposed i.e. their centers are disposed in alignment to the center of the food strand or a respective extrusion opening, respectively. Products with different rounded shapes such as balls, cylindrically formed parts with rounded ends or drop-shaped products can thereby be created by the motion of the flat displacement elements from a severing position to an open position and a motion back to the severing position in dependence of the speed of the food strand.

During the motion of n flat displacement elements, where $n \in \mathbb{N}$, and $n > 2$, from the open position O to the severing position A, the edges of the openings defining the overall opening can move from n sides in the direction toward the center M of the overall opening. During the motion of the flat displacement elements from the severing position A to the open position O, the edges of the openings can move toward n sides away from the center. Even and nice rounded shapes can be produced like this.

Advantageously, the openings in the flat displacement elements have a cross-sectional area which is approximately 10% smaller to 10% larger than the cross-sectional area of the supplied food strand or the extrusion opening creating the food strand and is preferably approximately equal in size. A maximum overall opening can thereby be provided which has at least the cross-section of the extrusion opening of a respective feed, so that any back-up of the food strand is avoided. The resulting area of the overall opening should be no greater than that of the extrusion opening of the food strand, so that the food does not exit laterally at the edge of the opening.

The openings preferably have an enclosed circumference so that multiple openings can be arranged in series. The openings are preferably configured to be round or oval, but have at least curved portions which then form the edges of the overall opening in order to be able to produce a nice rounded shape of the product.

If the displacement elements each have adjacently disposed multiple openings for multiple corresponding food strands, then multiple formed food products can be produced in a simple inexpensive manner parallel to each other with only one forming device and one corresponding movement mechanism.

The movement mechanism preferably comprises at least one rotary member, in particular a rotatable disc, on which the flat displacement elements are rotatably mounted. The displacement elements can according to a preferred embodiment be moved simultaneously therewith by using a rotary member on a curved path, which is simple and inexpensive to implement. The flat displacement elements are there distributed, for example, around the circumference of the rotary member, preferably at equal spacing. Different curved paths having different directions of movement thereby arise for the different displacement elements at a specific angle of rotation of the rotary member, i.e. in a predetermined time interval, such that the openings in the flat displacement elements can be moved relative to each other.

It is possible that the displacement elements are at their two oppositely disposed end portions rotatably mounted on a respective rotary member. For example, one rotary member can be driven and the other rotary member can rotate freely for guiding.

At least one rotary member should be drivable. It is advantageous if this rotary member can be driven in two directions of rotation, as, for example, a collision of a displacement element with a coupling axis of a subsequent displacement element is possible when coupling multiple displacement elements to one side of a rotary member. If the rotary member can be driven in two directions of rotation, then the device can be moved, for example, in one first direction of rotation from an open position to the severing position and be rotated in a direction opposite to the direction of rotation back from the severing position to the open position. Any collision can thereby be prevented. In addition, the rotary member must be moved in an angular range (e.g. 0°-110°) between the severing position and the maximum open position. However, it is also possible that multiple rotary members can be driven.

It is further possible that the movement mechanism on one side of the two sides comprises multiple rotary members between which the displacement elements are guided. At most one flat displacement element is at a front or rear side of the rotary members respectively coupled to its end portion. At its other end portion, the respective displacement element can by way of a respective guide (e.g. also co-traveling rotary members on the front or rear sides of which also always one displacement element is coupled) be entrained on the respective path. A respective arrangement allows the rotary member to be able to move continuously in one direction without the above-mentioned collision occurring. The drive of the multiple rotary members can be effected by coupling to one motor. However, two or more separate motors can also be used, where the shape of the products to be produced can then still be further influenced.

It is also possible that the coupling points of the flat displacement elements of the rotary member exhibit varying distances to the central axis of the rotary member. The shape of the product can again further be influenced thereby. A further possibility is that the openings in the flat displacement elements are not round but have a shape differing therefrom. When the coupling points then also revolve on different radii and the drive speed of the rotary member is adjusted accordingly, then products having a specific shape can be produced.

The device advantageously comprises a controller which can adjust the extrusion speed of the food strand in dependence of the position of the flat displacement elements. The shape of the products can be precisely adjusted by correlating the extrusion speed and the position of the flat displacement elements at a given point in time.

A filling machine is provided according to the invention for producing formed food with a forming device for forming and partitioning a food strand according to the invention. The filling machine comprises a hopper for receiving the pasty food mass, as well as a conveying device, e.g. a vane pump, that conveys the pasty food mass into a filling member, e.g. a stuffing tube or a filling flow divider with at least one extrusion opening. The displacement elements are then arranged in the direction of transport directly downstream of the extrusion opening. The displacement elements are disposed so close to the extrusion opening that there is sufficient play for the flat displacement element to freely slide past the outlet opening.

The guide for the displacement elements is advantageously configured such that the center M of the respective overall opening of the superposed openings and the center of the respective extrusion opening of the filling member are in alignment. A nice symmetrical shape can then be created, where the pasty mass can be extruded evenly over the entire cross-section of the extrusion opening without causing partial back-ups.

The filling member of the filling machine advantageously comprises a filling flow divider through which the pasty food mass is conveyed to multiple extrusion openings. The flat displacement elements than each also have multiple respective openings that are in alignment with the extrusion openings of the filling flow divider. Multiple products can thereby be produced in parallel in a simple manner.

The filling machine advantageously comprises a control device which controls the movement mechanism and the conveying device. The filling machine can there comprise a controller which is disposed within the filling machine and actuates both the movement mechanism and the conveying device. It is also possible to have the filling machine comprise a separate control device, where the movement mechanism is actuated by a separate controller and the two controllers are in one example coupled to each other to coordinate the functions of the movement mechanism, in particular the position of the individual displacement elements in dependence of time, as well as the functions of the conveying device, in particular the conveying speed, to each other depending on a desired product shape.

In the method according to the invention, the movement mechanism is actuated such that more than two flat displacement elements are moved from a severing position to an open position on a curved path, where the flat displacement elements are superposed with each other in the severing position such that the cross-sectional area of the resulting overall opening of the superposed openings is zero and the cross-sectional area of the overall opening in the open position has a predetermined maximum cross-section. The flat displacement elements can then again be moved from this open position on a curved path to the severing position. The food strand is then in the severing position severed, so that single products are created. During the movement of the displacement elements between the severing positions, the pasty food mass is moved through the extrusion opening of the filling member and through the adjoining expanding or tapering overall opening of the flat displacement elements.

The pasty food mass is advantageously continuously or in portions extruded, where in the severing position, the speed of the food strand relative to the flat displacement elements in the direction of transport T is reduced, and in one example, reduced to 0.

This can either be realized in that the food mass is extruded in portions, where the food flow is stopped or at least reduced when the displacement elements are in the severing position such that the food does not accumulate at the displacement elements. However, it is also possible that the forming device is configured in a certain section as being co-traveling in the direction of transport T, i.e. that the separating device can move at substantially the same speed as the strand of filling material, so as to prevent any back-up of the product. The extrusion member must for this be designed to be telescopic, so that the uppermost separating element and the extrusion opening are always disposed close together.

The openings can for severing the food strand be superposed in such a manner that the edges defining the respective openings slide past one another such that the food product is cut off. This means that the displacement elements are first moved on their curved path such that the overall opening reduces with the movement until the area of the overall opening becomes zero and the displacement elements are then moved even further along the path until the food product is cut off by the edges that move past each other. This is particularly advantageous for fibrous foods. But it is also possible that the displacement elements are moved on the curved path only until the area of the overall opening becomes zero. One respective guide is sufficient, for example, for foods of homogeneous consistency, as for example with potato dough.

BRIEF DESCRIPTION OF THE FIGURES

The invention shall be explained below in more detail with reference to the following figures.

FIG. 11 is a flow chart of an example method according to the invention.

DETAILED DESCRIPTION

FIGS. 1-10 show the relative positioning of various components of the forming device. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
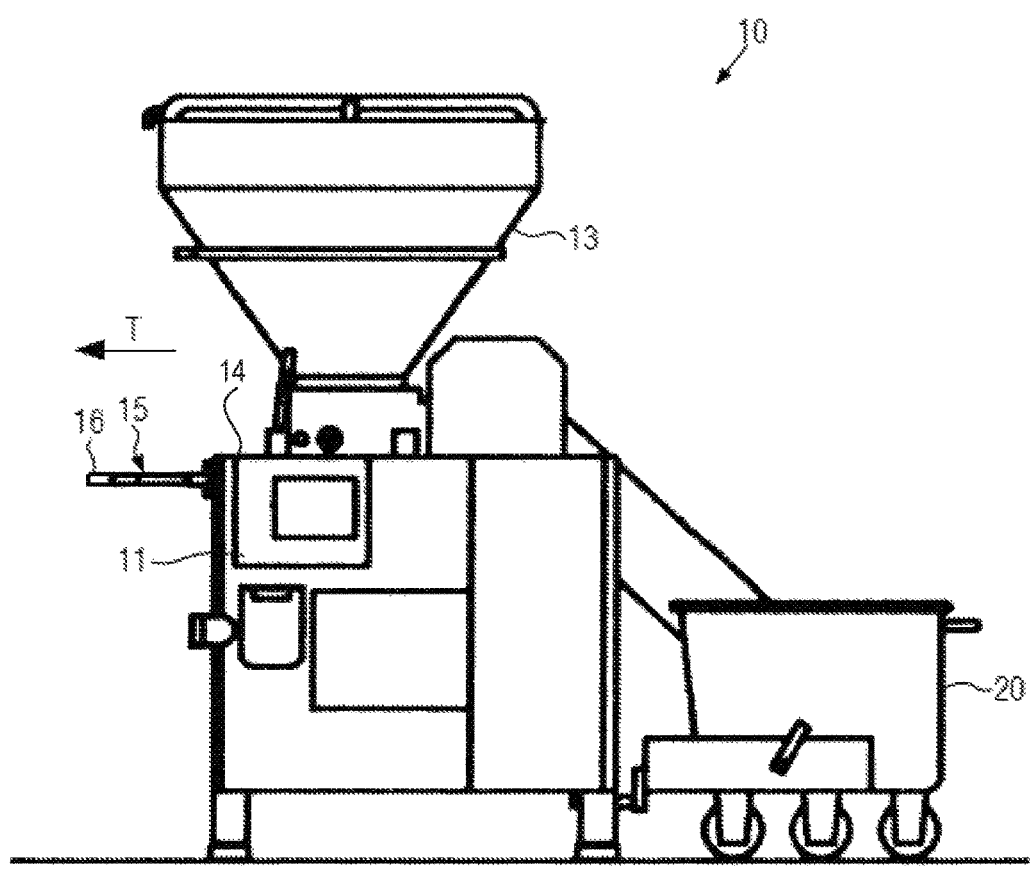
FIG. 1 very schematically shows a side view of a filling machine with a forming device according to the present invention.

FIG. 1 very schematically shows a side view of a filling machine 10 according to the present invention. Filling machine 10 comprises a hopper 13 for receiving pasty mass, i.e. pasty foods, such as sausage meat or potato mass etc. The pasty food can be raised, for example, via sausage meat carriage 20 and a respective lifting device and be dumped into hopper 13. A not specifically shown conveyor is located below hopper 13, in particular a vane pump that pushes the pasty food into a filling member 15. Filling member 15 can comprise, for example, a stuffing tube from which the food is extruded. The filling member can, as is apparent in particular from FIG. 2, comprise a filling flow divider 16 which divides the filling flow and extrudes it in parallel from multiple extrusion openings 8. The filling machine further comprises a controller 11 and a display 21.

Figure 2:
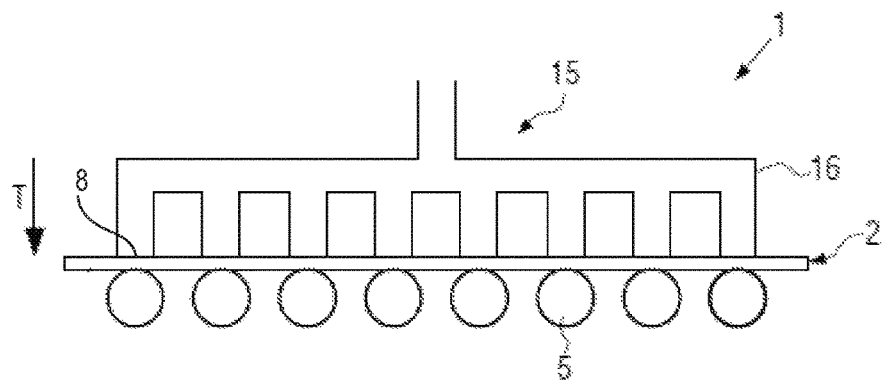
FIG. 2 very schematically shows a plan view onto a filling flow divider with a forming a device.

In order to form the extruded food strand, a forming device 1 is provided according to the invention and is disposed, as is apparent in particular from FIG. 2, close to extrusion openings 8 of the filling flow divider or to extrusion opening 8 of the stuffing tube.

Figure 3:
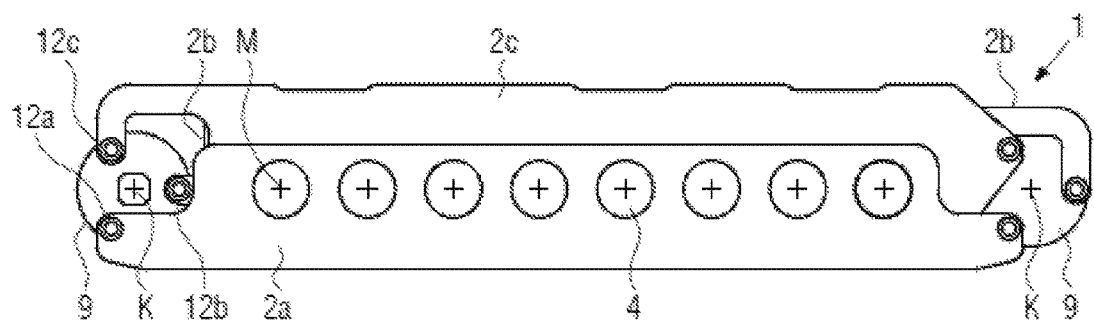
FIG. 3 very schematically shows a side view onto a forming device with three flat displacement elements.

The forming device comprises at least three displacement elements 2a, b, c that are in the direction of transport T of the food strand located above each other, as is apparent, for example, from FIG. 3 showing a forming device with three flat displacement elements, presently: three flat displacement plates. Respective displacement elements 2a, b, c each comprise at least one opening 3a, b, c, d. In the embodiment shown in FIG. 3, respective displacement elements 2a, b, c comprise a total of eight openings 3a, b, c, which are each disposed beside each other on the respective displacement elements.

Forming device 1 further comprises a movement mechanism 6 for moving flat displacement elements 2a, b, c on respective curved paths, such that respective openings 3a, b, c can move relative to each other, so that the cross-sectional area of the resulting overall opening 4 of superposed openings 3a, b, c changes. Movement mechanism 6 in this embodiment comprises, for example, a rotary member, presently a rotatable disk 9, on the side surfaces of which flat displacement elements 2a, b, c are rotatably mounted to coupling points 12a, b, c, for example, with one bolt each. As can be seen in particular from FIG. 3, flat displacement elements 2a, b, c are rotatably mounted at a second rotary member, presently: rotary disk, at their oppositely disposed ends likewise at respective coupling points, for example by use of bolts. The displacement elements are there arranged distributed uniformly around the circumference of rotary member 9, i.e. presently e.g. each at a spacing of 120°.

At least one of the rotary members, presently: e.g., rotary member 9 shown at the left in FIG. 3, is in this embodiment driven, for example, by a motor, not shown, in particular a servomotor. The rotary member arranged on the other side of displacement elements 2a, b, c then only serves guiding purposes. A respective curve guide etc. could also be provided instead of this rotary member.

Figure 4A:
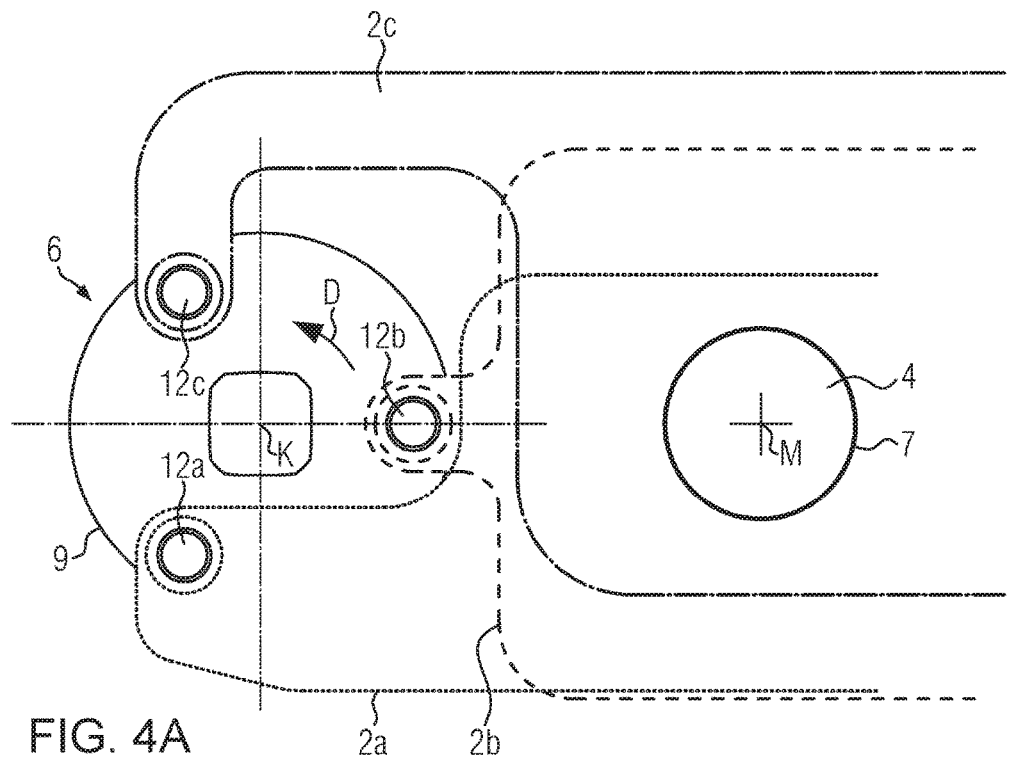
FIGS. 4A-4F show the movement of the displacement elements on their curved path from an open position to a severing position.

FIG. 4A for reasons of simplicity shows only a partial region of the forming device with displacement elements 2a, b, c, d in an open position O, in which the cross-sectional area of overall opening 4 has a predetermined maximum cross-section. In this particular embodiment, individual openings 3a, b, c of displacement elements 2a, b, c are thereby completely superposed. Center M of resulting overall opening 4 and center M of extrusion opening 8 of the extrusion member are in alignment with each other. The maximum overall opening 4 there has a cross-sectional area which corresponds approximately to the cross-sectional area of the supplied food strand 5 or of extrusion opening 8 creating the food strand. Back-up of the food strand can thereby be prevented. The food strand can be extruded through extrusion opening 8 through overall opening 4. The displacement element facing extrusion opening 8 moves closely along the extrusion opening with so much play that the displacement element can freely slide over the opening.

Figure 4B:
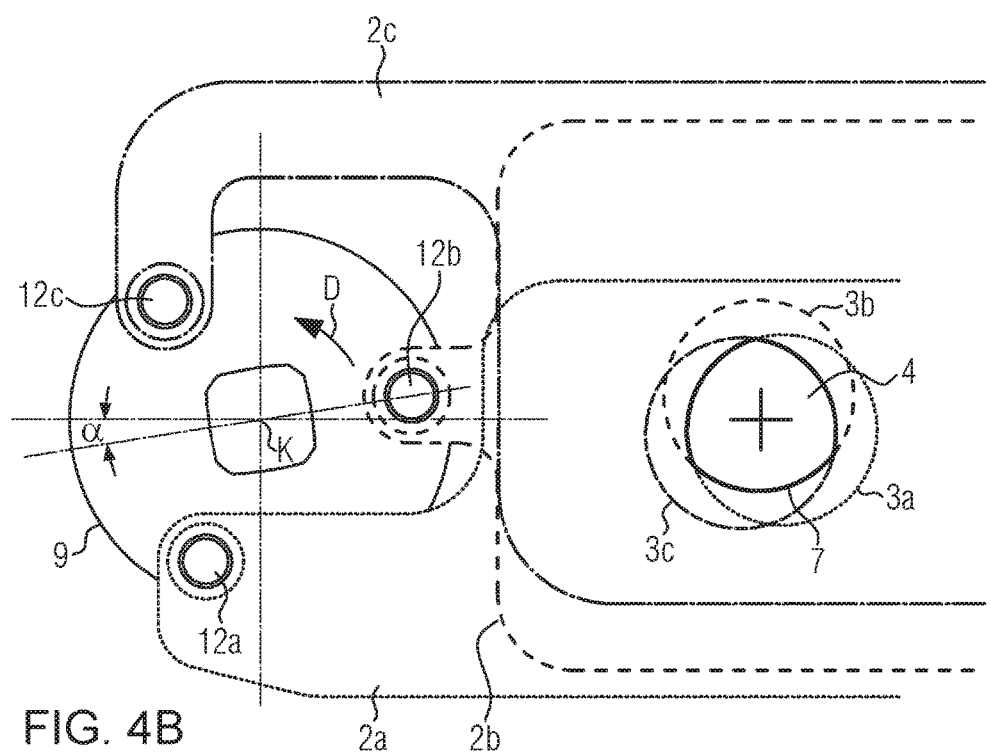

From the open position shown in FIG. 4A, individual displacement elements 2a, b c can move along a curved path in which rotary member 9 rotates in the direction of rotation D. FIG. 4B shows the forming device shown in FIG. 4A in which the rotary member has rotated by an angle α in the direction of rotation D: presently to the left about central axis K.

Figure 4C:
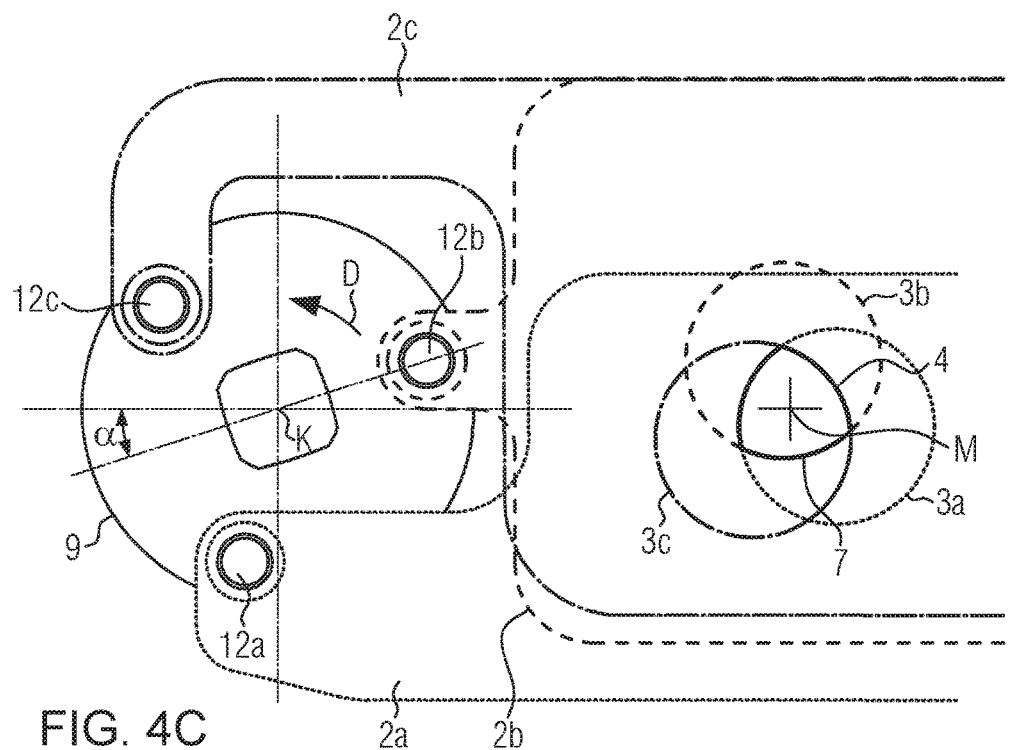

As can be seen in FIG. 4B, also openings 3a, b, c move along the curved path upon the movement of the displacement elements. Since displacement elements 2a, b, c are arranged distributed at the circumference, the displacing elements move on different curved paths such that openings 3a, b, c move apart and the cross-sectional area of the resulting overall opening 4 becomes smaller. Center M of the resulting overall opening is still in alignment with center M of extrusion opening 8. Respective superpositioning of openings 3a, b, c results in a rounded triangle. FIG. 4C shows the forming device shown in FIG. 4A, 4B; in which rotary member 9 has been further rotated by an angle α of approximately 20° as compared to FIG. 4A. As can be seen in the comparison of FIGS. 4B and 4C, edges 7 of openings 3a, b, c defining overall opening 4 move from three sides toward center M of overall opening 4.

Figure 4D:
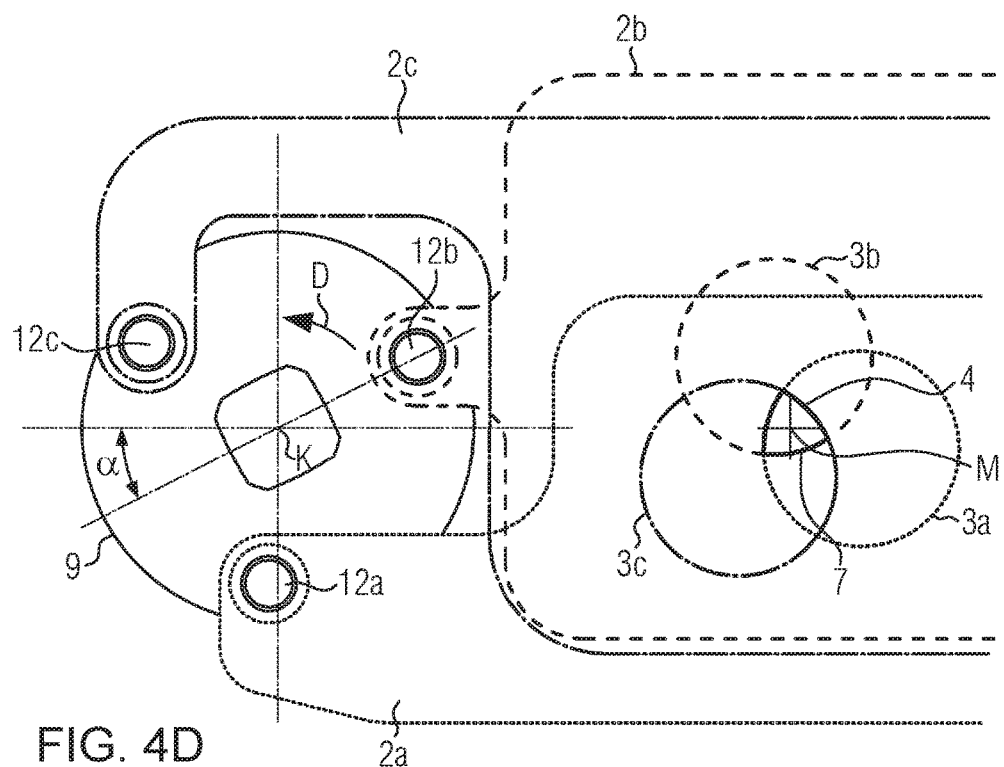
Figure 4E:
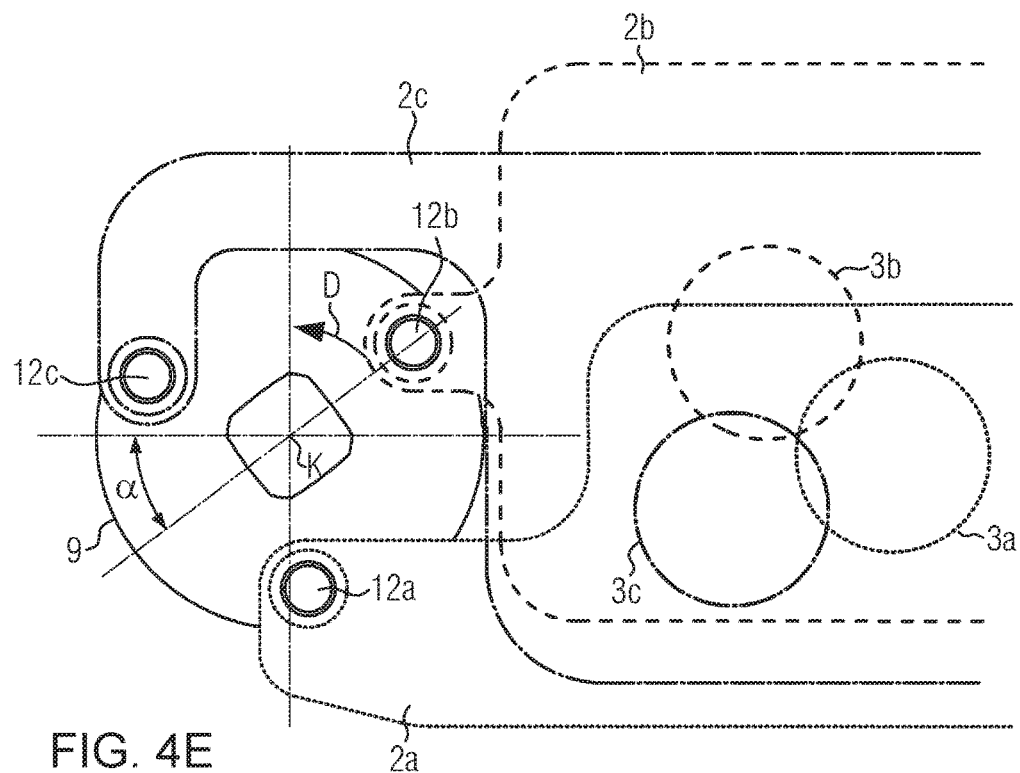
Figure 4F:
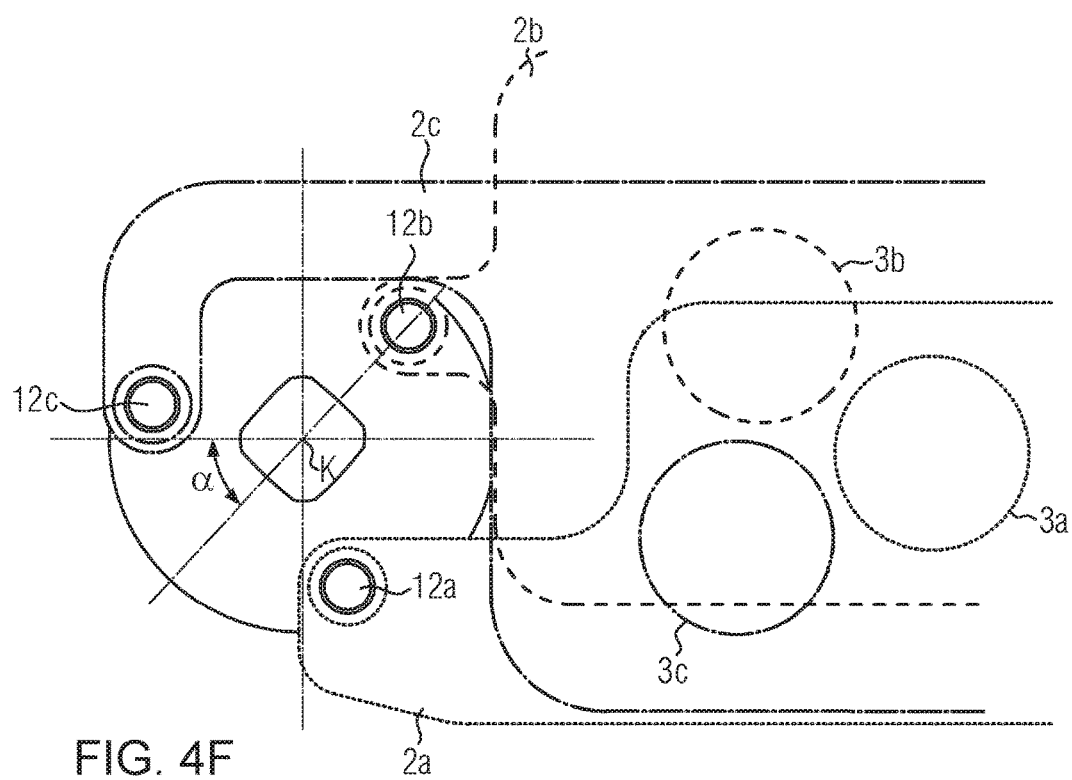

FIG. 4D for this example shows a rotational angle α of rotary member 9 of approximately 26°. As is evident, displacement elements 2a, b, c, c move on respectively curved paths, such that openings 3a, b c are superposed such that the cross-sectional area of the resulting overall opening 4, i.e. the locus of intersection of the openings further decreases and edges 7 of the openings defining overall opening 4 move further toward the center M of overall opening 4. FIG. 4E shows a movement of rotary member 9 by an angle α of 37°. The area of overall opening 4 is there zero, i.e. openings 3a, b, c of all displacement elements have no common locus of intersection, i.e., no longer have a resulting overall opening. In this position, the food strand is severed. As shown in FIG. 4F, displacement elements 2a, b, c, d can still move beyond this position, (where edges 7 slide past each other and cut off the food product) presently: e.g. up to an angle α of e.g. 45° in order to cut off the food with a clean cut. Here as well, no overall opening exists, no opening 3a, b, c intersects another opening.

Flat displacement elements 2a, b, c can from positions 4e or 4f then again be moved against the direction of rotation D back to starting position A, as shown in FIG. 4A. Drive member 9 can for this be driven in two directions of rotation by use of the servo drive. Due to the above-described mounting of the displacement elements, they always remain properly in alignment, presently: horizontally, so that the respective center M of overall opening 4 is always in alignment with center M of extrusion opening 8, even if multiple strands are produced in parallel, i.e., multiple extrusion openings 8 are arranged in series.

Figure 5:
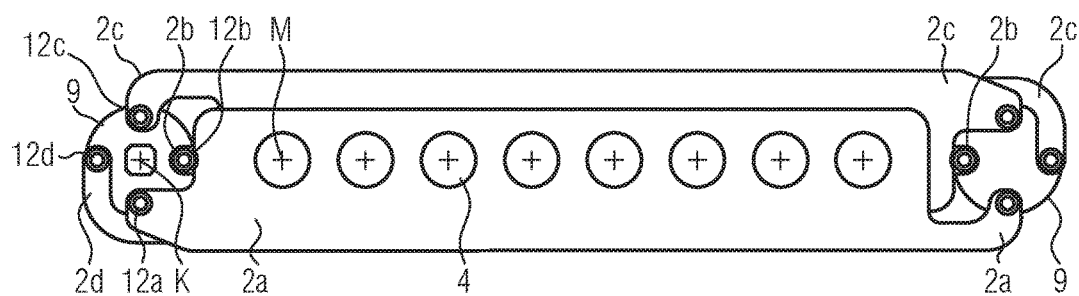
FIG. 5 shows a side view onto a forming device according to the present invention with four displacement elements.

FIG. 5 shows an embodiment according to the present invention that corresponds to the embodiments shown in connection with FIGS. 3 and 4 with the exception that four displacement elements are there arranged offset by 90° from one another around the circumference of rotary member 9 in such a manner that a rectangle with rounded edges is formed as the overall opening when displacement elements 2a, b, c, d move relative to each other from an open position as shown in FIGS. 6A-6F along a curved path.

Figure 6A:
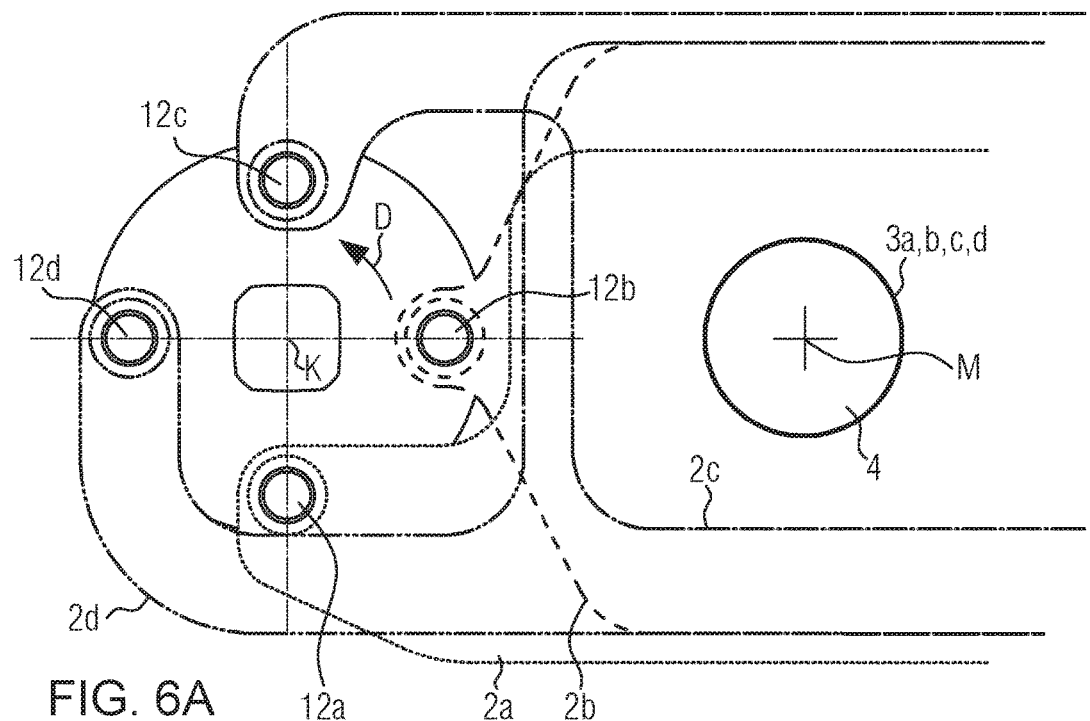
FIGS. 6A-6F very schematically show the movement of the displacement elements from an open position to a severing position.
Figure 6B:
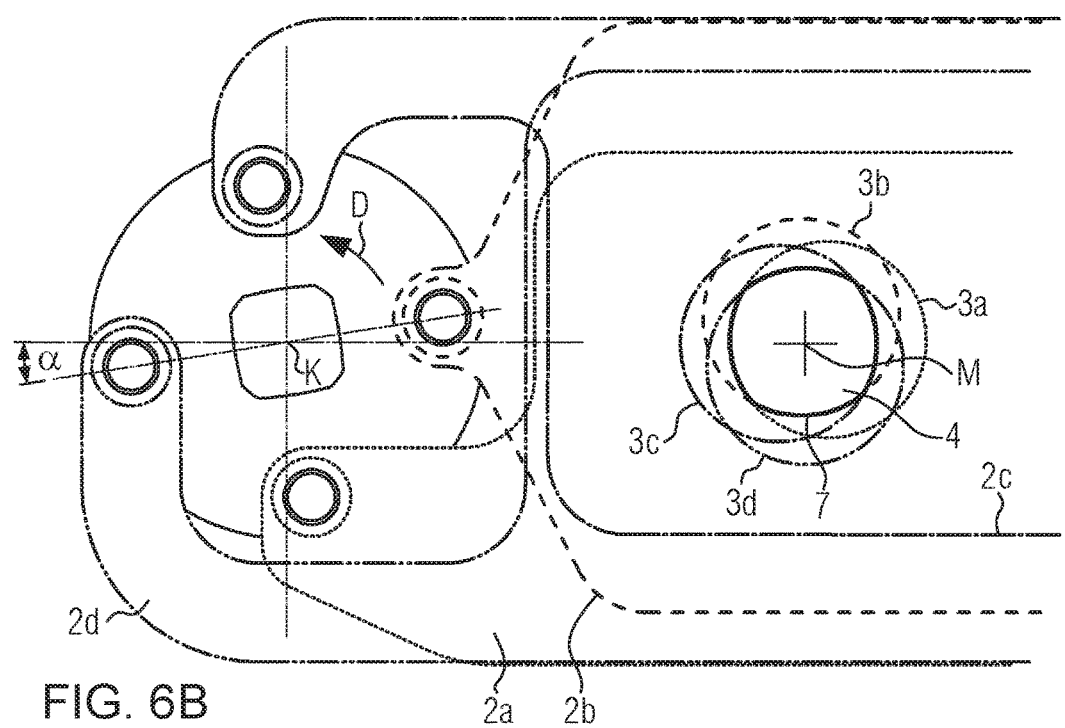
Figure 6C:
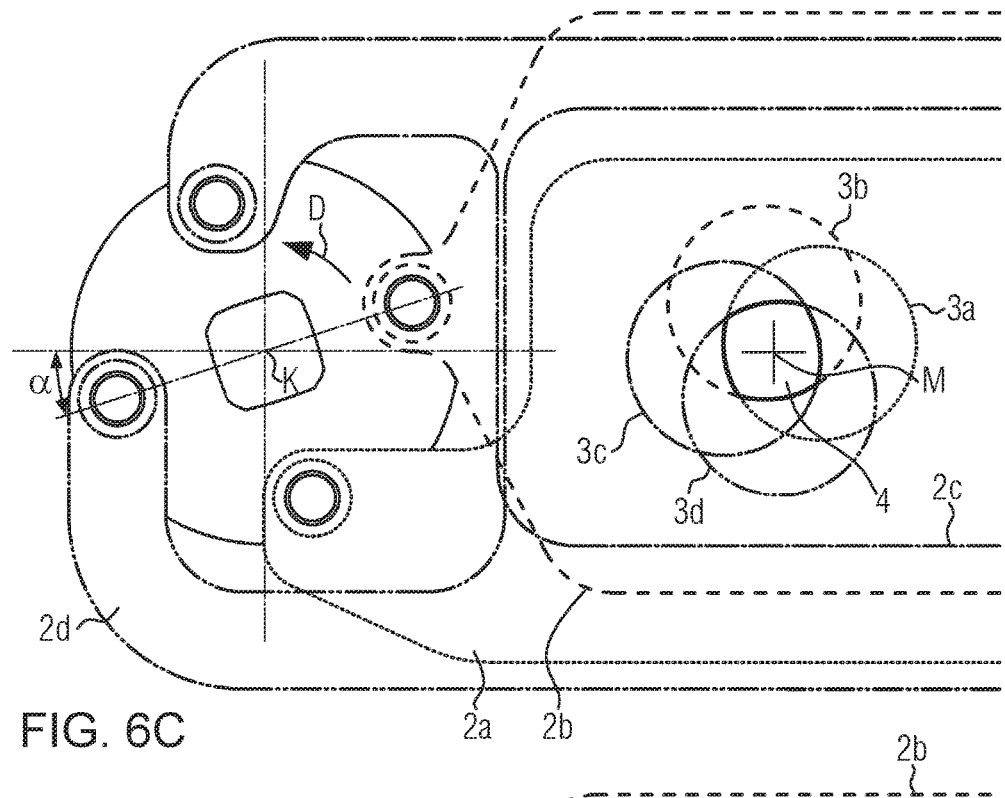
Figure 6D:
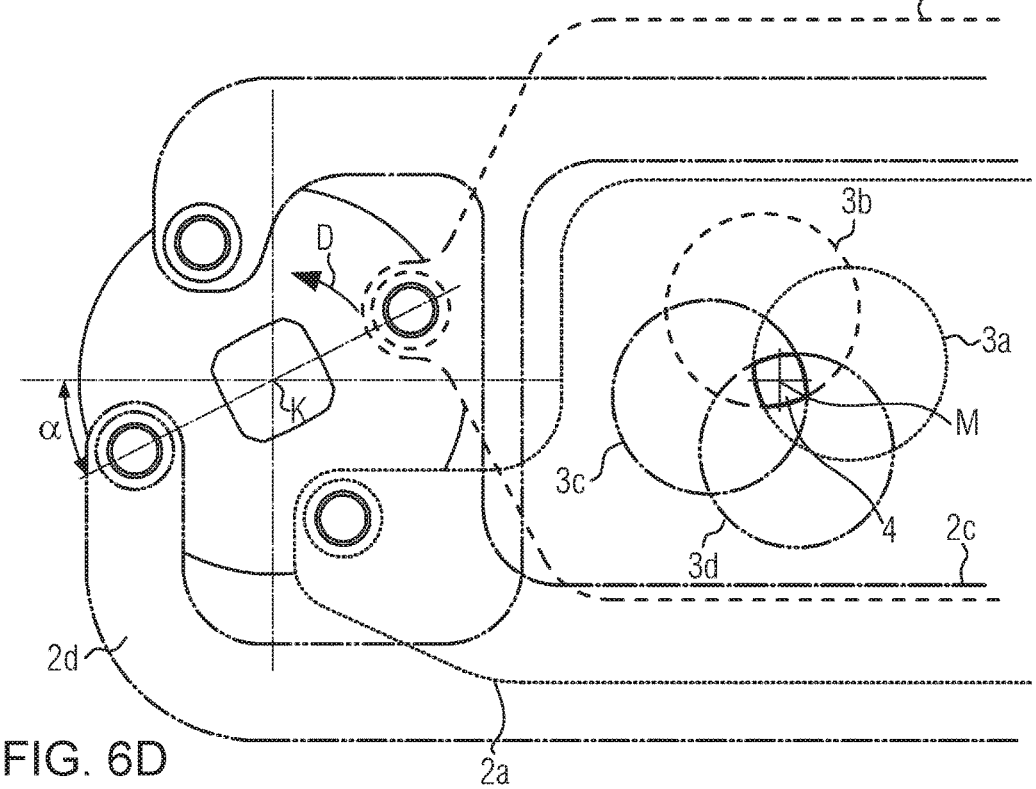
Figure 6E:
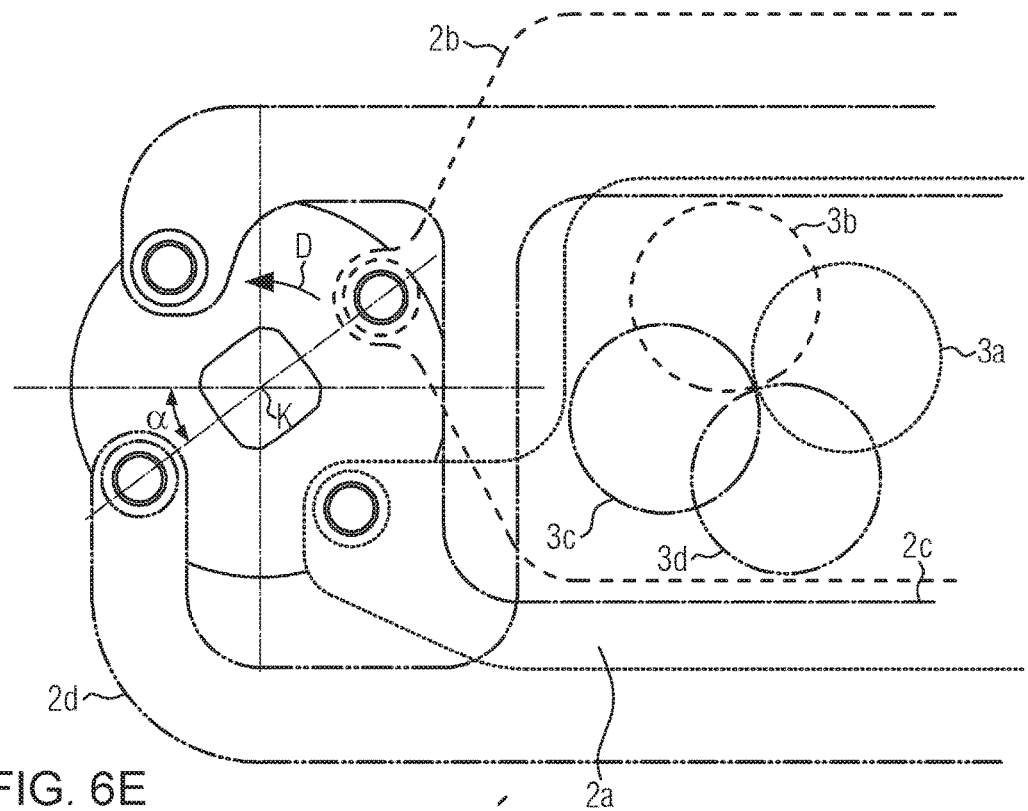
Figure 6F:
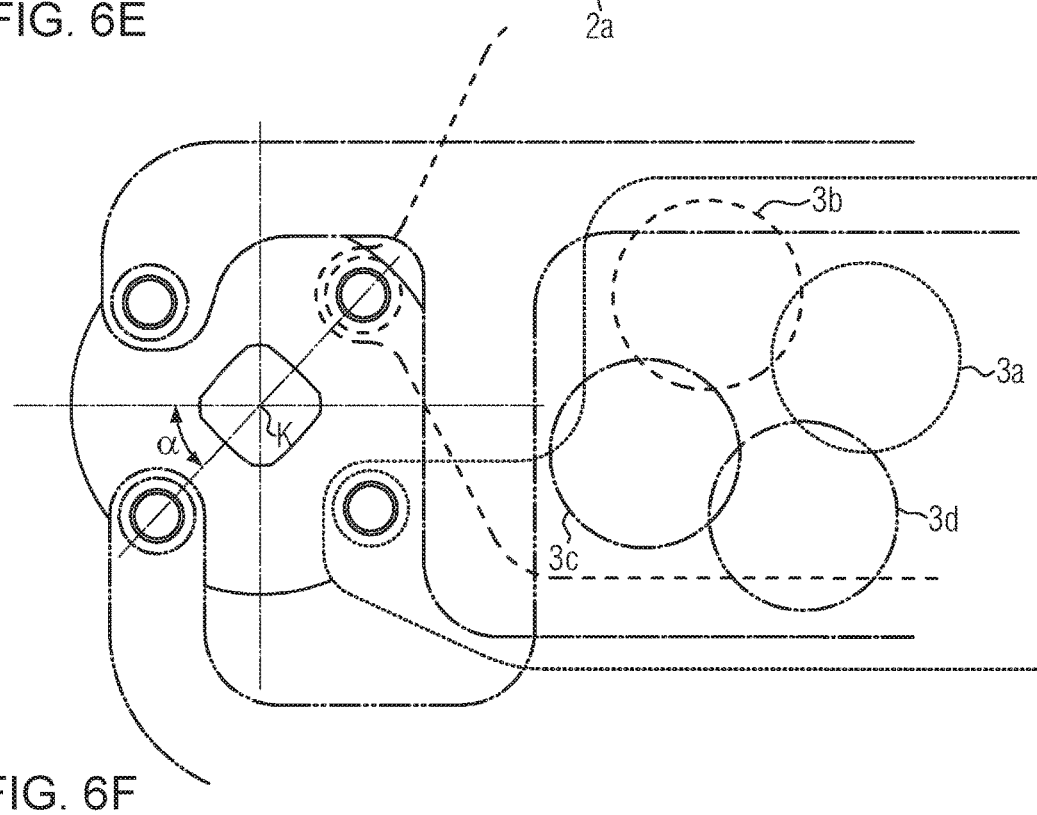

FIG. 6A shows a rotational angle of α=0°, i.e. an open position in which, as also described in one embodiment d, the cross-sectional area has the predetermined maximum cross-section which corresponds to the maximum cross-section of the food product. FIG. 6B shows a rotational angle α of about 8° and overall opening 4 reducing in size as a result thereof. FIG. 6C shows a rotational angle α of about 17° and the resulting overall opening. FIG. 6D shows a rotational angle of about α=26°. FIG. 6E shows a rotational angle α of 36° and corresponds to a severing position in which there is no longer any common locus of intersection of all openings 3a, b, c, d, i.e. no overall opening 4 and the food strand is severed. FIG. 6F shows a rotational angle α of approximately 46° in which there is likewise no resulting overall opening of the superposed openings 3a, b, c, d. The two embodiments were shown in connection with three or four displacement elements. In one example, n<=6.

Openings 3a, b, c, d in one embodiment comprise a closed circumference and may be configured as being round. This is particularly advantageous since the overall opening also has a round cross-section when all openings 3a, b, c, d are superposed to 100%. When moving the displacement elements on a curved path, the initially round passage opening changes into a rounded polygon, so that a nice rounded shape of the product produced can be created. However, the openings can also have a shape differing from the circular shape, in one example with rounded or curved sections.

But it is also possible that coupling points 12 on the rotary member are not all disposed on the same radius, but at different distances to central axis K, whereby the shape of the products can be influenced. For example, if openings 3a, b, c, d in the displacement elements are not round but have a differing shape, then the shape can also be influenced. If unequal distances of coupling points 12 to center K of rotary member 9 are selected, then the speed can be controlled with a possibly speed-variable drive of rotary member 9 in such a manner that products of a desired shape, e.g. again round, can be produced. The arrangement and configuration of the openings there depends substantially on the desired shape. The openings, however, may be round and arranged on the same radius.

Figure 7:
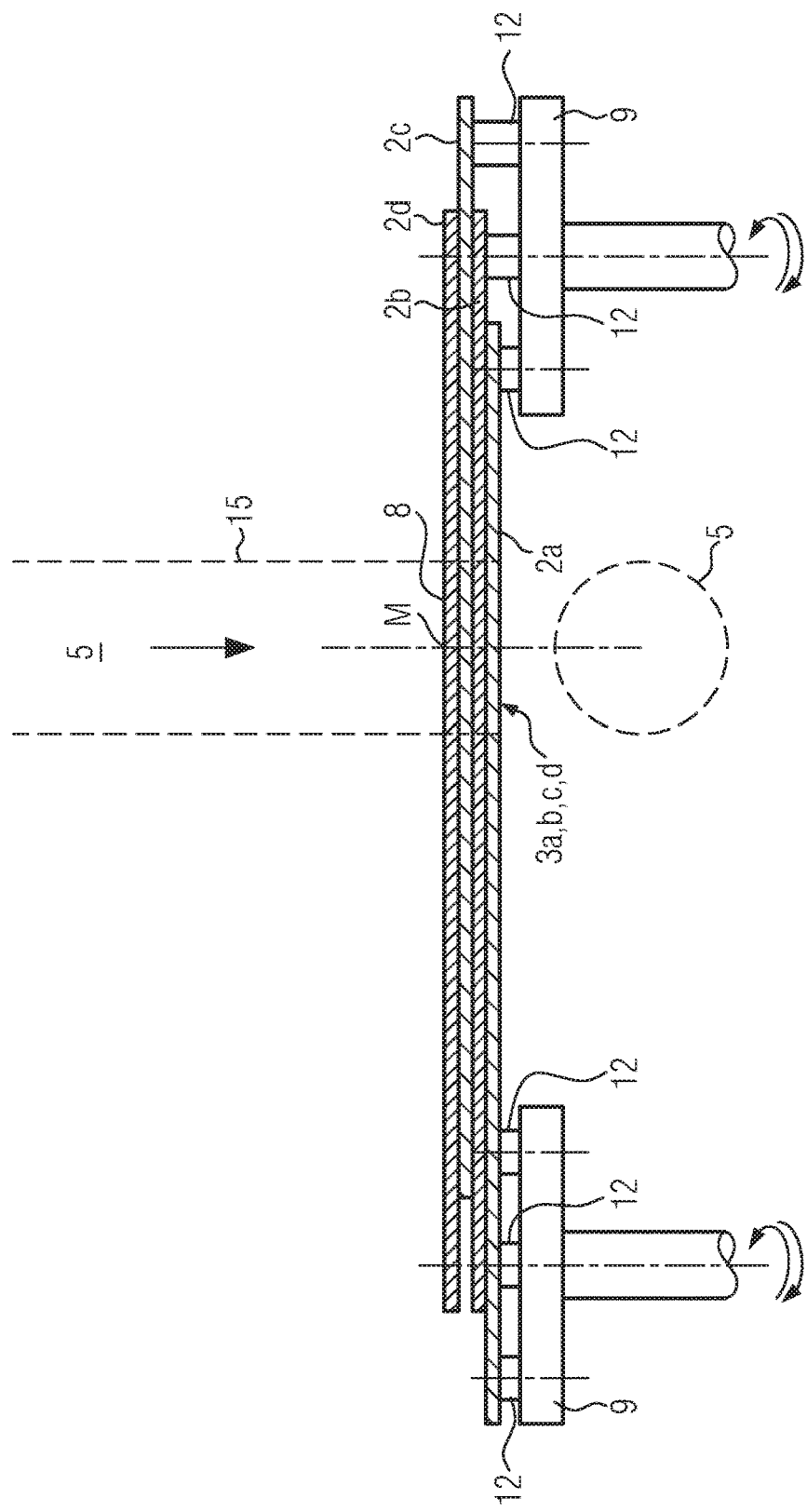
FIG. 7 shows a cross-section through a forming device with four displacement elements according to an embodiment.

FIG. 7 corresponds to the embodiment shown in FIGS. 5 and 6 with four displacement elements which are at corresponding coupling points 12 connected to rotary member 9. Coupling points 12 are there located at the front side of rotary member 9 which is disposed opposite from filling member 15. The drive of rotary member 9, presently: the rotary member illustrated of the left in FIG. 7, moves to and fro within a certain angle α, presently e.g. <90°, because otherwise coupling points 12, i.e., the coupling axes, can collide with the trailing displacement elements. Since four displacement elements are in this embodiment arranged offset by 90° on rotary member 9, the rotary member can therefore move to and from by less than 90°. This angular range, however, is sufficient to bring the openings from an open position O to a severing position A, as previously explained.

Figure 8:
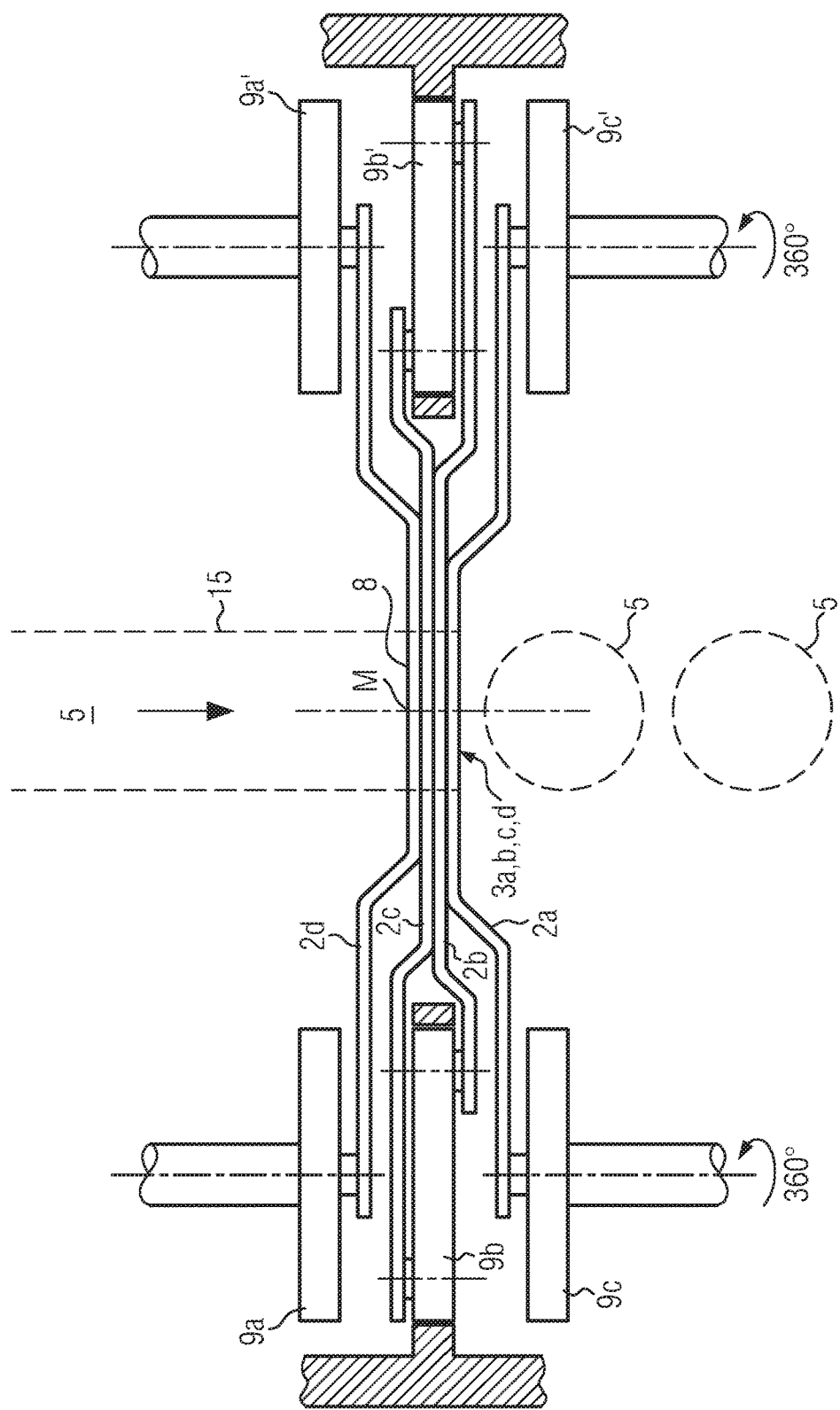
FIG. 8 shows a cross-section through a forming device according to a further embodiment.
Figure 9:
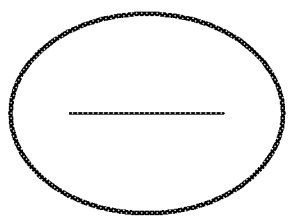
FIG. 9 shows a formed product according to prior art.
Figure 10:
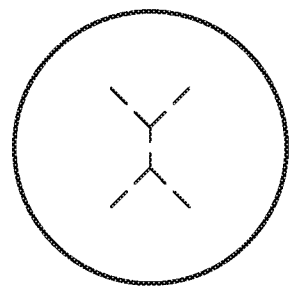
FIG. 10 shows a formed product that was produced with a forming device according to the present invention.

FIG. 8 shows a further embodiment of the present invention which substantially corresponds to the previous embodiments, with the exception that rotary member 9 can be rotated continuously in the direction of rotation D.

For this purpose, movement mechanism 6 comprises respective multiple rotary members 9a, b, c, 9a', b', c' at the oppositely disposed ends of displacement elements 2a, b, c, d. Displacement elements 2a, b, c, d are coupled to the rotary members such that only one flat displacement element at its end portion is coupled to one side (the side that is perpendicular to the axis of rotation) of a rotary member. Displacement element 2a is coupled to the upper side of rotary member 9c, displacement element 2d is coupled to the underside of rotary member 9a. At the same time, displacement element 2a is also coupled to the upper side of rotary member 9c', and displacement element 2d is coupled to the underside of rotary member 9a'.

Displacement element 2b is coupled to the underside of rotary member 9b as well as to the underside of rotary member 9b'. Displacement element 2c is coupled to the upper side of rotary member 9b as well as to the upper side of rotary member 9b'. Each displacement element is at least with one end portion disposed on a driven rotary member. For example, rotary members 9a, b, c can be driven and rotary members 9a', 9b' and 9c' can serve as guides. The drive of rotary member 9b is for reasons of simplicity presently not drawn in. Rotary member 9b can be moved, for example, by used of a gear drive or a belt drive.

The previous embodiments have been described with three and four displacement elements. Also suitable, however, is the use of five or six displacement elements. The filling machine further comprises a controller which actuates both movement mechanism 6 as well as the conveying device for the pasty food mass 14.

The control device can there be the control device for the filling machine. It is also possible, however, that the control device of the filling machine is coupled to a separate controller for movement mechanism 6.

The controller there adapts the position of the individual displacement elements at a given point in time and the extrusion speed of the food to each other in dependence of a desired shape of the food product. The extrusion speed can be constant or vary, i.e. the extrusion speed, for example, decreases when the displacement elements approach a severing position A. The food strand is advantageously made available in a portioning manner, i.e. extrusion of the food strand is in the simplest case stopped completely when the displacement elements are disposed in the severing position A, i.e. at a position in which the strand can not be conveyed through an overall opening. Operation with continuous food extrusion is also possible. For example, the entire forming device can there in a certain section be designed as being co-traveling in the direction of transport T, and the extrusion member must be designed as being telescopic so that the uppermost displacement element and the extrusion opening always remain close together.

The method according the present invention is explained below in detail with reference to FIGS. 3 and 4.

In the method according to the invention, the filling material is conveyed from hopper 3 by way of conveying device 14 into filling member 15. Filling member 15 there comprises, for example, filling flow divider 16 via which the food strand can be extruded through multiple, presently: e.g. eight extrusion openings.

When producing a formed food product, the displacement elements are initially in a position in which openings 3a, b, c of displacement elements 2a, b, c, d are not superposed, such that no common overall opening 4 is given there, as shown for example in FIGS. 4F and 4E.

In a respective severing position A, in which the displacement elements can be closed in a covering manner, the food strand is severed.

Rotary member 9 is now rotated in a direction opposite to the direction of rotation D by a certain angle such that, as can be seen in FIG. 4D, openings 3a, b, c are superposed in such a manner that a common locus of intersection of the opening, i.e. overall opening 4 arises, whose center M is in alignment with center M of the extrusion opening. Overall opening 4 is defined by edges 7 of the respective openings 3a, b, c. If the rotary member continues to be rotated in a direction opposite to the direction of rotation D, then the overall cross-section of overall opening 4 increases, as shown in FIGS. 4C and 4B. Rotary member 9 continues to be rotated in the direction opposite to the direction of rotation D until the cross-sectional area of overall opening 4 has a predetermined maximum cross-section. Individual openings 3a, b, c are in this case superposed to 100% and form a circular overall opening.

The food strand is during the movement of the displacement elements moved through the forming device and formed by the cross-sectional change.

Starting out from the open position A in FIG. 4A, for example, rotary member 9 is then rotated in the opposite direction, i.e. in the direction of rotation D such that the cross-sectional area of overall opening 4 is again reduced, as shown in FIG. 4E, until overall opening 4 no longer exists. The displacement elements are then advantageously moved a bit further in the direction of rotation D to sever or cut off the filling material flow with a clean cut, see FIG. 4F. It is in principle sufficient, however, when the displacement elements are taken to a severing position as shown in FIG. 4E. It is only essential that the cross-sectional area of the overall opening then is 0. The extrusion speed of the food strand can in a severing position be reduced as compared to the open position (FIG. 4A) or be set to 0, such that the pasty food does not accumulate when the forming device is closed.

The process described above then repeats continuously. While the one end portions of the displacement elements are in this embodiment driven by drive member 9, the oppositely disposed end portions are guided, presently in one embodiment likewise by a co-traveling rotary member. In the embodiments described above, the displacement elements are moved and rotated by use of a rotary member on a curved path. However, it is also possible to move the displacement elements in a respective curved guide by use of a drive.

A flow chart of an example method 1100 according to the present invention for producing a formed food product with a filling machine is shown at FIG. 11. Method 1100 includes at step 1102, actuating a movement mechanism such that more than two flat displacement elements are moved from a severing position to an open position on a curved path, where said flat displacement elements are in said severing position superposed such that no resulting overall opening of said superposed openings exists and a food strand is severed, and where a cross-sectional area of said overall opening in an open position is a predetermined maximum cross-section. At step 1104, said flat displacement elements are then again moved on a curved path from said open position to said severing position. Said openings are, for severing said food strand, superposed such that edges defining said respective openings slide past one another such that said food product is cut off, or said displacement elements are moved on the curved path only until the area of said overall opening of the displacement elements becomes zero. At step 1106, pasty food mass is moved through an extrusion opening of a filling member and through an expanding or tapering overall opening of said flat displacement elements. At step 1106, said pasty food mass may be extruded continuously or in portions from said extrusion opening, and when said displacement elements are in said severing position, a speed of said food strand relative to said flat displacement elements may in a direction of transport reduced, including reduced to 0.

The invention claimed is:

1. A forming device for forming and partitioning a pasty food strand, comprising:
   more than two flat displacement elements superposed in a direction of transport of said food strand, each having at least one opening through which said food strand is movable in said direction of transport, and
   a movement mechanism for moving said flat displacement elements on respective curved paths, such that said respective openings of said flat displacement elements are superposed and movable relative to each other so that a cross-sectional area of a resulting overall opening of said superposed openings changes,
   wherein said movement mechanism comprises at least one rotary member, and wherein said flat displacement elements are coupled and distributed about a circumference of said rotary member.

2. The forming device according to claim 1, wherein said movement mechanism is configured such that said flat displacement elements are movable to a severing position in which said openings are aligned to each other such that no overall opening exists and are movable to an open position in which the cross-sectional area of said overall opening has a predetermined maximum cross-section.

3. The forming device according to claim 2, wherein during a motion of a total number, n, of the flat displacement elements from said open position to said severing position, edges of said openings defining said overall opening move from n sides in a direction toward a center M of said overall opening and during the motion of the n flat displacement elements from said severing position to said open position, said edges of said openings can move toward the n sides away from said center M.

4. The forming device according to claim 1, wherein said openings have an enclosed circumference and/or are formed round or oval or at least have curved sections.

5. The forming device according to claim 1, wherein said respective flat displacement elements each comprise multiple adjacently disposed openings for multiple food strands.

6. The forming device according to claim 1, wherein said flat displacement elements are, at their two oppositely disposed end portions, rotatably mounted on a respective rotary member.

7. The forming device according to claim 1, wherein said at least one rotary member is driven.

8. The forming device according to claim 7, wherein said at least one rotary member is driven in two directions of rotation and/or multiple rotary members are driven.

9. The forming device according to claim 1, wherein said movement mechanism comprises multiple rotary members on one side,
   where at most one flat displacement element is respectively coupled on its end portion at a front or rear side of said rotary members and is at its other end portion guided on a respective path.

10. The forming device according to claim 1, wherein coupling points of said flat displacement elements on said rotary member exhibit varying distances to a central axis of said rotary member.

11. The forming device according to claim 1, wherein said forming device further comprises a controller which controls said movement mechanism, including a position of said flat displacement elements in dependence of time and an extrusion speed of said food strand.

* * * * *